United States Patent [19]

Lang et al.

[11] Patent Number: 4,518,291

[45] Date of Patent: May 21, 1985

[54] PLASTICS MATERIAL EXPANSION DOWEL WITH WAVE-FORM SLOTS

[75] Inventors: Gusztav Lang, Munich; Armin Hoffmann, Germering; Heinz Bisping, Munich, all of Fed. Rep. of Germany

[73] Assignee: Hilti Aktiengesellschaft, Fürstentum, Liechtenstein

[21] Appl. No.: 582,460

[22] Filed: Feb. 22, 1984

[30] Foreign Application Priority Data

Mar. 11, 1983 [DE] Fed. Rep. of Germany ....... 3308755

[51] Int. Cl.³ .............................................. F16B 7/00
[52] U.S. Cl. ....................................... 411/60; 403/297
[58] Field of Search ............... 403/297, 292, 289, 290; 411/60, 57, 62, 44, 15

[56] References Cited

U.S. PATENT DOCUMENTS 3,413,887 12/1968 Von Wolff et al. .................. 411/62
4,142,440 3/1979 Schefer ............................. 411/57 X

FOREIGN PATENT DOCUMENTS 2847595 5/1980 Fed. Rep. of Germany ........ 411/62

*Primary Examiner*—Andrew V. Kundrat
*Attorney, Agent, or Firm*—Toren, McGeady, Stanger

[57] ABSTRACT

A plastics material expansion dowel has an axially extending dowel body with a central hole extending in its axial direction and with wave-form slots also extending in the axial direction and opening into the central hole. The wave-form slots have alternating crests and troughs. The width being greatest at the top of the crests and the bottom of the troughs and being least at the transition between the crests and the troughs. A spreading screw can be inserted into the central hole for effecting the expansion of the dowel body. The number of wave crests exceeds the number of wave troughs in the screw-in direction of the spreading screw by one. Further, the outside surface of the dowel body has axially spaced groove-like recesses extending in the circumferential direction for affording surface profiling.

12 Claims, 2 Drawing Figures

PLASTICS MATERIAL EXPANSION DOWEL WITH WAVE-FORM SLOTS

SUMMARY OF THE INVENTION

The present invention is directed to a plastics material expansion dowel with an axially extending cylindrically shaped dowel body. A central hole is located in the dowel body extending in its axial direction and is arranged to receive a spreading screw. Wave-form slots are formed in the dowel body extending in its axial direction with the slots located on two opposite sides of the central hole and extending over at least a portion of the length of the dowel body.

Expansion dowels of the type described above are expanded, after insertion into an appropriately sized receiving hole, by a spreading member usually in the form of a conventional wood screw. The dowel is anchored in the receiving hole by pressing the outside surface of the dowel body against the surface defining the hole. The anchoring effect of the dowel is better when more of its outside surface is available for contact with the surface of the receiving hole. Accordingly, on one hand, the anchorage of the dowel is determined by the dowel body surface. On the other hand, the anchorage is affected by the degree to which the dowel body is expanded by the spreading screw. Therefore, it has been common practice to provide a longitudinal or axially extending slot in the dowel body to facilitate its expansion.

The shape of the slot can cause the problem that the spreading screw moves from the dowel axis and through the slot with insufficient expansion of the dowel body and resulting in a reduced anchoring effect.

To prevent the spreading screw from moving from the desired position in the dowel body, it has been known to provide wave-form elongated slots staggered so that each wave crest is diametrically opposite a wave trough on the opposite side of the central hole into which the spreading screw is inserted. While any displacement of the spreading screw can be counteracted by this arrangement, another disadvantage develops. The disadvantage is that the spreading screw, when being screwed into the dowel body, will abrade the dowel body material in the area of the wave crests which face in the direction opposite to the screw-in direction of the spreading screw and pull the removed material along in the central hole. In the regions where dowel body material has been removed, inadequate spreading pressure is developed and the dowel body surface located in such region is not available for anchoring the dowel. This disadvantage is intensified to a greater degree where grooves, recesses or the like are provided in the dowel body surface for affording surface profiling. Therefore, the primary object of the present invention is to provide an expansion dowel containing wave-form elongated slots which counteract any displacement of the spreading screw and do not have any disadvantageous effect on the quality of the anchoring of the dowel.

In accordance with the present invention, the dowel body is formed into dowel body halves defined by the wave-form slots and the slots are arranged in the screw-in direction of the spreading screw so that the slots form one more wave crest than wave troughs.

Therefore, the elongated slots located on two opposite sides of the central hole are divided evenly into wave crests and wave troughs and the slots are staggered so that a wave crest on one side is opposite a wave trough on the other side. In such an arrangement, each dowel body half in the screw-in direction of the spreading screw has one additional wave crest as compared to the wave troughs. Such an arrangement automatically results in the presence, in the direction opposed to the spreading screw-in direction, of one more wave trough than wave crests on each dowel body half. As a result, each dowel body half in the spreading screw-in direction has one more wave crest than wave troughs.

When threading in the spreading screw, the dowel body material in the region of the wave crests facing in the spreading screw-in direction is displaced into the elongated slots so that the slots are filled and are available for the generation of spreading pressure. Such an arrangement does not reduce the surface area of the dowel body which provides the anchoring effect, on the contrary, it enlarges the surface area. Due to the fact that the number of wave crests which face in the direction opposite to the spreading screw-in direction is smaller, and though they tend to have a negative influence on the anchoring effect, overall there is an increase in the dowel body surface determining the anchoring quality of the dowel. As a result, the dowel arrangement embodying the present invention not only prevents the spreading screw from being displaced, but it also improves the anchoring quality of the plastics material dowel.

As described above, in a plastics material expansion dowel with wave-form elongated slots it is the wave crest regions which are particularly useful in the build-up of an adequate spreading pressure. The wave crests directed in the screw-in direction of the spreading screw are of particular importance.

For adapting the dowel body surface to a corresponding receiving hole, the surface is profiled for improving the anchoring quality of the expansion dowels. The surface profiling is usually in the form of groove-like recesses, however, there is a certain contradiction involved in the use of such recesses, since it decreases the dowel body surface available for anchoring contact with the surface within the receiving hole. As a result, searching for an appropriate comprise is indispensible and this task is rendered more difficult by other influencing factors involved in the use of wave-form elongated slots.

Therefore, a further feature of the invention is the provision of the surface of the profiling in the dowel body surface in the region of the transition from the wave crests to the wave troughs along the slots. Groove-like recesses provide the profiling of the recesses extending in the circumferential direction around the dowel body transversely of the dowel body axis. In the region of the wave crests, that is, the locations in the dowel body where a significant spreading pressure is developed, the profiling does not result in surface reduction due to the presence of the recesses. It does, however, prevent the material displaced by the spreading screw from filling out the recesses and there is a certain loss in the build-up of the spreading pressure. Therefore, in accordance with the present invention, the recesses are provided only in those parts of the dowel body which contribute to a lesser degree in the build-up of the spreading pressure. Accordingly, the recesses formed in the dowel body surface do not impair the quality of the anchoring effect.

To adapt the dowel body around its entire circumference to the surface of the receiving hole, the groove-like recesses preferably encircle the dowel body completely extending around both of its dowel body halves. Preferably, the surface profiling is provided by annular grooves with an U-shaped or V-shaped transverse section and preferable the transition surface between the dowel body surface and the surface in the grooves is rounded. For the adaptation to the surface of the receiving hole and for influencing the dowel body surface, the width and depth of the groove-like recesses is preferably in the range of 0.5 to 0.15 the outside diameter of the dowel body.

As mentioned above, in the region of the wave crests formed in the slots and pointing in the screw-in direction of the spreading screw, the dowel body material is pressed into the wave-form slot, filling it at least partly. Accordingly, the space provided by the slot must correspond essentially to the material volume displaced by the dowel body in order to prevent any harmful force peaks that would tend to increase the resistance to threading it in the spreading screw. For this reason, it is expedient if the width of the wave-form elongated slots increases to the top of the wave crests and the bottom of the wave troughs. With such an arrangement, the elongated slots have a variable width with the maximum width being located in the region where the maximum material displacement occurs. Advantageously, the width ratios of the elongated slots is such that the width at the top of the wave crests and at the bottom of the wave troughs is about 1.5 times the width in the transition region between the wave crests and the wave troughs.

The wave-form elongated slots may assume any wave-form. In addition to having a serrate, saw-tooth or similar shape, a sinusoidal shaped slot has proven to be essentially useful with regard to the distribution of forces in the dowel body. With regard to the dimensions of the slot, a preferred arrangement is obtained by making the amplitude in a sinusoidal design equal approximately to one-fourth of the outside diameter of the dowel body with the half wave length being approximately equal to the outside diameter of the dowel body. Such a dimensional arrangement affords ratios in the more popular dowel sizes which lead, in view of the arrangement of the slots, to each dowel body half having two wave crests in the spreading screw-in direction opposed by one wave crest in the opposite direction.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
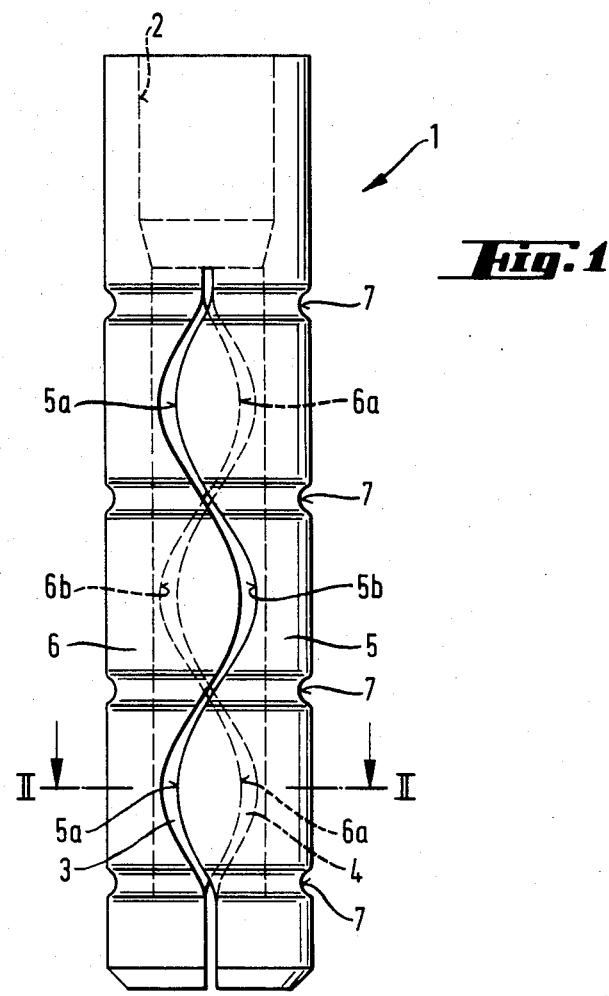
FIG. 1 is an elevational view of a plastics material expansion dowel embodying the present invention.

In FIG. 1 a plastics material expansion dowel embodying the present invention is shown and is formed by an axially extending cylindrically shaped dowel body 1. As viewed in FIG. 1 the upper end of the dowel body 1 is its trailing end and the lower end is its leading end, that is, the end first inserted into a receiving hole in which the expansion dowel is to be anchored. As shown in dotted lines, a central hole 2 extends axially through the dowel body from its trailing end to adjacent its leading end. A pair of elongated slots 3, 4 extending in the axial direction of the dowel body divide it into two dowel body halves 5, 6. Each of the slots, 3, 4, is located on an opposite side of the central hole 2. As can be seen in FIG. 1, the elongated slots 3, 4 have a sinusoidally shaped wave-form. The slots 3, 4 are staggered relative to one another so that in the same dowel body half a wave crest 5a, 6a is located opposite a wave trough 5b, 6b. Further, in FIG. 1 it is shown that each dowel body half 5, 6, in the screw-in direction of a spreading screw, known per se, and, therefore, not illustrated, and with a standard, right-hand thread, has one more wave crest 5a, 6a than wave valleys 5b, 6b.

The outside surface of the dowel body 1 is profiled by groove-shaped recesses 7 which intersect the elongated slots 3, 4 in the region of the transition from the wave crests 5a, 6a to the wave troughs 5b, 6b. As can be seen in FIG. 1 the slots have a variable width along their length with the least width being located at the transition region from the wave crests to the wave troughs and increasing to the maximum width at the top of the wave crests 5a, 6a and at the bottom of the wave troughs 5b, 6b.

Figure 2:
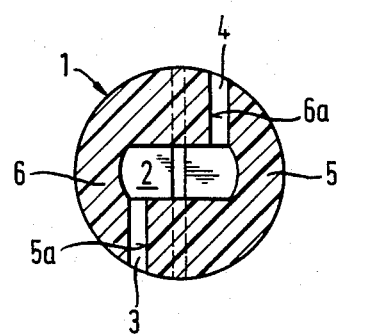
FIG. 2 is a transverse sectional view of the dowel shown in FIG. 1 taken along the line II—II.

In the transverse section in FIG. 2 it can be noted that in the region extending approximately between the uppermost and lowermost recesses 7 as viewed in FIG. 1, the central hole 2 is not round, but rather has a somewhat rectangular shape. This non-circular section of the hole 2 is selected so that the wall thickness of the dowel body 1 is greater in the region of the elongated slots 3, 4 and this feature affords further protection against the displacement of the spreading screw from the axial direction of the dowel body. At the leading end of the dowel body and at the end of the slots adjacent to the trailing end, the wave-form elongated slots 3, 4 extend parallel to the axis of the dowel body. Further, the central hole 2 is a blind hole terminating short of the leading end of the dowel body 1 in the region of the lowermost recess 7 as viewed in FIG. 1. The slots 3, 4, however, extend to the leading end of the dowel body and extend across its full diameter, note the broken line and full line showing FIG. 2.

While specific embodiments of the invention have been shown and described in detail to illustrate the application of the inventive principles, it will be understood that the invention may be embodied otherwise without departing from such principles.

We claim:

1. Plastics material expansion dowel comprising an axially extending dowel body with a generally cylindrically shaped outside surface, said body being arranged to be inserted into a receiving hole and having a leading end and a trailing end with the leading end inserted first into the receiving hole, said dowel body having a central hole extending in the axial direction thereof from the trailing end and arranged to receive a spreading screw inserted into the trailing end to be threaded into the central hole for expanding said dowel body into engagement with the surface of the receiving hole, said dowel body having a wave-form slot therein extending in the axial direction thereof on each of two opposite sides of the central hole with said slots extending for at least a part of the axial length of said dowel body, wherein the improvement comprises that said dowel body over the axial length of said slots is divided into said dowel body halves by said slots and said central hole, and said wave-form slots in the screw-in direction of the spreading screw have alternating wave crests and wave troughs with the number of wave crests exceeding the wave troughs by one, said slots having transition regions located between adjacent wave crests and wave troughs, the outside surface of said dowel body only in the transition region of the slots from the wave crests to the wave troughs is profiled by recesses extending in the circumferential direction of said dowel body in a plane disposed perpendicularly to the axis of the dowel body.

2. Plastics material expansion dowel, as set forth in claim 1, wherein said recesses are groove-shaped.

3. Plastics material expansion dowel, as set forth in claim 2, wherein said groove-shaped recesses encircle said dowel body in the circumferential direction in both of said dowel body halves.

4. Plastics material expansion dowel, as set forth in claim 1, wherein the width of said recesses is in the range of 0.05 to 0.15 times the outside diameter of said dowel body.

5. Plastics material expansion dowel, as set forth in claim 1, wherein the depth of said recesses in the range of 0.5 to 0.15 times the outside diameter of said dowel body.

6. Plastics material expansion dowel, as set forth in claim 1, wherein the width and the depth of said recesses are in the range of 0.05 to 0.15 times the outside diameter of said dowel body.

7. Plastics material expansion dowel comprising an axially extending dowel body with a generally cylindrically shaped outside surface, said body being arranged to be inserted into a receiving hole and having a leading end and a trailing end with the leading end inserted first into the receiving hole, said dowel body having a central hole extending in the axial direction thereof from the trailing end and arranged to receive a spreading screw inserted into the trailing end to be threaded into the central hole for expanding said dowel body into engagement with the surface of the receiving hole, said dowel body having a wave-form slot therein extending in the axial direction thereof on each of two opposite sides of the central hole with said slots extending for at least a part of the axial length of said dowel body, wherein the improvement comprises that said dowel body over the axial length of said slots is divided into the dowel body halves by said slots and said central hole, and said wave-form slots in the screw-in direction of the spreading screw have alternating wave crests and wave troughs with the number of wave crests exceeding the wave troughs by one, the width of said wave-form slots increases to a maximum at the top of said wave crests and at the bottom of said wave troughs.

8. Plastics material expansion dowel, as set forth in claim 7, wherein the minimum width of said slots is in the region of the transition between the wave crests and the wave troughs.

9. Plastics material expansion dowel, as set forth in claim 8, wherein the maximum width of said slots is 1.5 times the width of said slots in the transition region between the wave crests and the wave troughs.

10. Plastics material expansion dowel comprising an axially extending dowel body with a generally cylindrically shaped outside surface, said body being arranged to be inserted into a receiving hole and having a leading end and a trailing end with the leading end inserted first into the receiving hole, said dowel body having a central hole extending in the axial direction thereof from the trailing end and arranged to receive a spreading screw inserted into the trailing end to be threaded into the central hole for expanding said dowel body into engagement with the surface of the receiving hole, said dowel body having a wave-form slot therein extending in the axial direction thereof on each of two opposite sides of the central hole with said slots extending for at least a part of the axial length of said dowel body, wherein the improvement comprises that said wave-form slots are sinusoidally shaped with said slots opening into said central hole over the axial length of said central hole coextensive with said slots, said dowel body over the axial length of said slots is divided into dowel body halves by said slots and said central hole, and said wave-form slots in the screw-in direction of the spreading screw have alternating wave crests and wave troughs with the number of wave crests exceeding the wave troughs by one, said slots having transition regions located between adjacent wave crests and wave troughs, the outside surface of said dowel body only in the transition region of the slots from the wave crests to the wave troughs is profiled by recesses extending in the circumferential direction of said dowel body in a plane disposed perpendicularly to the axis of the dowel body, the outside surface of said dowel body between said grooves and from said groove closest to the leading end to the leading end and from said groove closest to the trailing end to the trailing end is smooth and cylindrically shaped, said central hole is a blind hole terminating adjacent to and spaced from the leading end of said dowel body, and said central hole coextensive with said wave-form slots has a generally rectangular section transverse to the axial direction.

11. Plastics material expansion dowel, as set forth in claim 1, wherein the ends of said wave-form slots at the leading end of said dowel body and adjacent the trailing end of said dowel body extend in parallel relation with the axis of said dowel body.

12. Plastics material expansion dowel, as set forth in claim 11, wherein said slots in the region between the leading end of said dowel body and the leading end of said central hole form a unitary slot extending across the diameter of said dowel body.

* * * * *